US 7,080,092 B2

(12) United States Patent
Upton

(10) Patent No.: US 7,080,092 B2
(45) Date of Patent: Jul. 18, 2006

(54) APPLICATION VIEW COMPONENT FOR SYSTEM INTEGRATION

(75) Inventor: Mitch Upton, Highlands Ranch, CO (US)

(73) Assignee: BEA Systems, Inc., San Jose, CA (US)

(*) Notice: Subject to any disclaimer, the term of this patent is extended or adjusted under 35 U.S.C. 154(b) by 621 days.

(21) Appl. No.: 10/271,194

(22) Filed: Oct. 15, 2002

(65) Prior Publication Data

US 2003/0093575 A1    May 15, 2003

Related U.S. Application Data

(60) Provisional application No. 60/347,919, filed on Oct. 18, 2001, provisional application No. 60/347,901, filed on Oct. 18, 2001.

(51) Int. Cl.
*G06F 17/30* (2006.01)
(52) U.S. Cl. ............... 707/102; 707/104.1; 719/311; 719/328
(58) Field of Classification Search ................ 707/3, 707/100, 102, 104.1, 4, 10; 719/311, 328; 715/501.1, 513; 709/203
See application file for complete search history.

(56) References Cited

U.S. PATENT DOCUMENTS

| 5,321,841 | A | 6/1994 | East et al. | 395/725 |
|---|---|---|---|---|
| 5,748,975 | A | 5/1998 | Van De Vanter | 395/793 |
| 5,801,958 | A | 9/1998 | Dangelo et al. | 716/18 |
| 5,835,769 | A | 11/1998 | Jervis et al. | 395/701 |
| 5,836,014 | A | 11/1998 | Faiman, Jr. | 395/707 |
| 5,862,327 | A | 1/1999 | Kwang et al. | 395/200.33 |
| 5,950,010 | A | 9/1999 | Hesse et al. | 395/712 |
| 5,961,593 | A | 10/1999 | Gabber et al. | 709/219 |
| 5,966,535 | A | 10/1999 | Benedikt et al. | 717/147 |
| 6,023,722 | A | 2/2000 | Colyer | 709/201 |
| 6,028,997 | A | 2/2000 | Leymann et al. | 717/104 |

(Continued)

FOREIGN PATENT DOCUMENTS

EP        1 006 443 A2      6/2000

(Continued)

OTHER PUBLICATIONS

C. Moran et al. "ARIES: A Transaction Recovery Method Supporting Fine-Granularity Locking and Partial Rollbacks Using Write-Ahead Logging", ACM Transaction on Database Systems, vol. 17, No. 1, Mar. 1992, pp. 94-162.

(Continued)

*Primary Examiner*—Greta Robinson
*Assistant Examiner*—Cheryl Lewis
(74) *Attorney, Agent, or Firm*—Fliesler Meyer LLP

(57) ABSTRACT

An application view, or application view component, can represent a self-describing interface to functionality in a resource such as an application or enterprise system. An application view can abstract away much of the complexity in dealing with the application, such that non-programmers can maintain the services and events exposed by an adapter for that application. Application views can also simplify the way in which adapters are accessed, and can allow the functionality exposed by the adapter to be invoked as a business service. An application view can be specific to a single adapter, and can define a set of functions on the corresponding application.

This description is not intended to be a complete description of, or limit the scope of, the invention. Other features, aspects, and objects of the invention can be obtained from a review of the specification, the figures, and the claims.

35 Claims, 6 Drawing Sheets

U.S. PATENT DOCUMENTS

| | | | |
|---|---|---|---|
| 6,029,000 A | 2/2000 | Woolsey et al. | 717/147 |
| 6,044,217 A | 3/2000 | Brealey et al. | 395/701 |
| 6,067,623 A | 5/2000 | Blakeley, III et al. | 713/204 |
| 6,085,030 A | 7/2000 | Whitehead et al. | 395/200.33 |
| 6,119,149 A | 9/2000 | Notani | 709/205 |
| 6,141,686 A | 10/2000 | Jackowski et al. | 709/224 |
| 6,154,738 A | 11/2000 | Call | |
| 6,189,044 B1 | 2/2001 | Thomson et al. | |
| 6,222,533 B1 | 4/2001 | Notani | 345/329 |
| 6,226,675 B1 | 5/2001 | Meltzer et al. | 709/223 |
| 6,226,788 B1 | 5/2001 | Schoening et al. | |
| 6,230,287 B1 | 5/2001 | Pinard et al. | 714/31 |
| 6,230,309 B1 | 5/2001 | Turner | 717/1 |
| 6,237,135 B1 | 5/2001 | Timbol | 717/1 |
| 6,269,373 B1 | 7/2001 | Apte et al. | |
| 6,282,711 B1 | 8/2001 | Halpern et al. | 717/11 |
| 6,292,830 B1 * | 9/2001 | Taylor et al. | 709/224 |
| 6,324,681 B1 | 11/2001 | Sebesta | 717/1 |
| 6,336,122 B1 | 1/2002 | Lee et al. | 707/204 |
| 6,338,064 B1 | 1/2002 | Ault et al. | 707/9 |
| 6,345,283 B1 | 2/2002 | Anderson | |
| 6,348,970 B1 | 2/2002 | Marx | |
| 6,349,408 B1 | 2/2002 | Smith | 717/11 |
| 6,353,923 B1 | 3/2002 | Bogel et al. | 717/4 |
| 6,356,906 B1 | 3/2002 | Lippert et al. | |
| 6,360,221 B1 | 3/2002 | Gough et al. | |
| 6,393,605 B1 | 5/2002 | Loomans | 717/121 |
| 6,438,594 B1 | 8/2002 | Bowman-Amuah | |
| 6,549,949 B1 | 4/2003 | Bowman-Amuah | 709/236 |
| 6,594,693 B1 | 7/2003 | Borwankar | 709/219 |
| 6,604,198 B1 | 8/2003 | Beckman et al. | 713/167 |
| 6,732,237 B1 | 5/2004 | Jacobs et al. | 711/119 |
| 6,795,967 B1 | 9/2004 | Evans et al. | 719/310 |
| 6,802,000 B1 | 10/2004 | Greene et al. | 713/168 |
| 6,804,686 B1 | 10/2004 | Stone et al. | 707/104.1 |
| 2001/0032263 A1 | 10/2001 | Gopal et al. | |
| 2002/0016759 A1 | 2/2002 | Marcready et al. | |
| 2002/0026630 A1 * | 2/2002 | Schmidt et al. | 717/103 |
| 2002/0073080 A1 | 6/2002 | Lipkin | |
| 2002/0111820 A1 * | 8/2002 | Massey | 705/1 |
| 2002/0120786 A1 * | 8/2002 | Sehayek et al. | 709/310 |
| 2002/0165936 A1 | 11/2002 | Alston et al. | |
| 2002/0174241 A1 | 11/2002 | Beged-Dov et al. | |
| 2002/0178170 A1 * | 11/2002 | Britton et al. | 707/100 |
| 2002/0184145 A1 | 12/2002 | Sijacic et al. | |
| 2002/0194495 A1 | 12/2002 | Gladstone et al. | |
| 2002/0198800 A1 * | 12/2002 | Shamrakov | 705/35 |
| 2003/0005181 A1 | 1/2003 | Bau III et al. | |
| 2003/0018665 A1 | 1/2003 | Dovin et al. | |
| 2003/0018832 A1 * | 1/2003 | Amirisetty et al. | 709/328 |
| 2003/0033437 A1 * | 2/2003 | Fischer et al. | 709/310 |
| 2003/0046266 A1 | 3/2003 | Mullins et al. | |
| 2003/0061405 A1 * | 3/2003 | Fisher et al. | 709/400 |
| 2003/0074467 A1 | 4/2003 | Oblak et al. | |
| 2003/0110117 A1 * | 6/2003 | Saidenberg et al. | 705/36 |
| 2003/0233631 A1 | 12/2003 | Curry | |
| 2004/0068568 A1 | 4/2004 | Griffin | |
| 2004/0133660 A1 | 7/2004 | Junghuber et al. | |
| 2004/0225995 A1 | 11/2004 | Marvin et al. | |
| 2005/0033663 A1 * | 2/2005 | Narin et al. | 705/27 |
| 2005/0223392 A1 * | 10/2005 | Cox et al. | 719/328 |

FOREIGN PATENT DOCUMENTS

| | | |
|---|---|---|
| EP | 1 061 445 A2 | 12/2000 |
| WO | 01/90884 A2 | 11/2001 |

OTHER PUBLICATIONS

Paul, Laura Gibbone, "RosettaNet: Teaching business to work together", Oct. 1, 1999. http://www.developer.com/xml/article.php/616641.

Hewlett-Packard, *HP Application Server*, Technical Guide Version 8.0, HP, Nov. 15, 2001, pp. 1-234.

Sun Microsystems, *Iplanet Application Server 6.0 White Paper*, iPlanet E-Commerce Solutions, May 25, 2000, pp. 1-104.

Enrique Duvos & Azer Bestavros, *An Infrastructure for the Dynamic Distribution of Web Application and Services*, Department of Computer Science Boston University, Dec. 2000, pp. 1-104.

Ed Roman & Rickard Öberg, *The Technical Benefits of EJB and J2EE Technologies over COM+ and Windows DNA*, Enterprise Edition (J2EE) Technologies, Dec. 1999, pp. 1-24.

Marcello Mariucci, *Enterprise Application Server Development Environments*, University of Stuttgart, Oct. 10, 2000, pp. 1-30.

U.S. Appl. No. 10/271,047, filed Oct. 15, 2002, Mitch Upton.

U.S. Appl. No. 10/271,156, filed Oct. 15, 2002, Mitch Upton.

U.S. Appl. No. 10/271,157, filed Oct. 15, 2002, Mitch Upton.

U.S. Appl. No. 10/271,162, filed Oct. 15, 2002, Mitch Upton.

U.S. Appl. No. 10/271,215, filed Oct. 15, 2002, Mitch Upton.

U.S. Appl. No. 10/271,244, filed Oct. 15, 2002, Mitch Upton.

U.S. Appl. No. 10/271,402, filed Oct. 15, 2002, Mitch Upton.

U.S. Appl. No. 10/271,410, filed Oct. 15, 2002, Mitch Upton.

U.S. Appl. No. 10/271,414, filed Oct. 15, 2002, Mitch Upton.

U.S. Appl. No. 10/271,423, filed Oct. 15, 2002, Mitch Upton.

Blake, "Rule-Driven Coordination Agents: A Self-Configurable Agent Architecture for Distributed Control", IEEE, Mar. 2001, pp. 271-277.

Dahalin et al., "Workflow Interoperability Using Extensible Markup Language (XML)", IEEE, Jul. 2002, pp. 513-516.

Kunisetty, "Workflow Modeling and Simulation Using an Extensible Object-Oriented Knowledge Base Management System", CiteSeer, 1996, pp. 1-60.

Lauer, C., "Introducing Microsoft.net" Jul. 2, 2002 (10 pages).

Van de Aaslt et al., "Verification of XRI: An XML-Based Workflow Language", IEEE, Jul. 2001, pp. 427-432.

* cited by examiner

APPLICATION VIEW COMPONENT FOR SYSTEM INTEGRATION

CLAIM OF PRIORITY

This application claims priority to U.S. Provisional Patent Application No. 60/347,919, filed Oct. 18, 2001, entitled "APPLICATION VIEW," as well as Application No. 60/347,901, filed Oct. 18, 2001, entitled "EVENT ADAPTER," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,162 entitled "SYSTEM AND METHOD FOR PROVIDING A JAVA INTERFACE TO AN APPLICATION VIEW COMPONENT," by Mitch Upton, filed Oct. 15, 2002.

U.S. patent application Ser. No. 10/271,244 entitled "SYSTEM AND METHOD FOR INVOKING BUSINESS FUNCTIONALITY FOR A WORKFLOW," by Mitch Upton, filed Oct. 15, 2002.

U.S. patent application Ser. No. 10/271,414 entitled "SYSTEM AND METHOD FOR USING WEB SERVICES WITH AN ENTERPRISE SYSTEM," by Mitch Upton, filed Oct. 15, 2002.

U.S. patent application Ser. No. 10/271,157 entitled "SYSTEM AND METHOD FOR IMPLEMENTING AN EVENT ADAPTER," by Mitch Upton, filed Oct. 15, 2002.

U.S. patent application Ser. No. 10/271,156 entitled "SYSTEM AND METHOD USING A CONNECTORARCHITECTURE FOR APPLICATION INTEGRATION," by Mitch Upton, filed Oct. 15, 2002.

U.S. patent application Ser. No. 10/271,047 entitled "SYSTEM AND METHOD FOR IMPLEMENTING A SCHEMA OBJECT MODEL IN APPLICATION INTEGRATION," by Mitch Upton, filed Oct. 15, 2002.

U.S. patent application Ser. No. 10/271,402 entitled "SYSTEM AND METHOD UTILIZING AN INTERFACE COMPONENT TO QUERY A DOCUMENT," by Mitch Upton, filed Oct. 15, 2002.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002.

U.S. patent application Ser. No. 10/271,215 entitled "SYSTEMS AND METHODS FOR INTEGRATION ADAPTER SECURITY," by Mitch Upton, filed Oct. 15, 2002.

U.S. patent application Ser. No. 10/271,410 entitled "SYSTEM AND METHOD FOR IMPLEMENTING A SERVICE ADAPTER," by Mitch Upton, filed Oct. 15, 2002.

1. Field of the Invention

The invention relates generally to components useful for integrating applications.

2. Background

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies field external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems.

Present integration systems, which have moved away from "hardwiring" systems together, still suffer from a lack of standards. Each integration vendor typically provides a proprietary solution for application integration, message transformation, message formats, message transport, and routing. Not one of these systems to date has achieved significant market share to enable its technologies to become the de-facto standard. This lack of standards has given packaged application vendors little incentive to integrate these systems with their applications. Further, each of these integration systems or servers has its own proprietary API, such that packaged application vendors cannot leverage development beyond a single integration server. This fragmentation of the integration market has provided little financial incentive for third parties.

BRIEF SUMMARY

Systems and methods in accordance with the present invention can provide for application integration by taking advantage of an application view, application view component, and/or application view object. A resource adapter can be used to invoke functionality in a first application and expose that functionality. An application view component can be used to provide a way for a second application to access the first application, and/or the invoked functionality, through the resource adapter. The application view component can allow the second application to access the first application without the second application knowing functional details about the first application. The application view component can allow bi-directional communication between the first application and the second application, and can translate messages between the applications.

Other features, aspects, and objects of the invention can be obtained from a review of the specification, the figures, and the claims.

DETAILED DESCRIPTION

Figure 1:
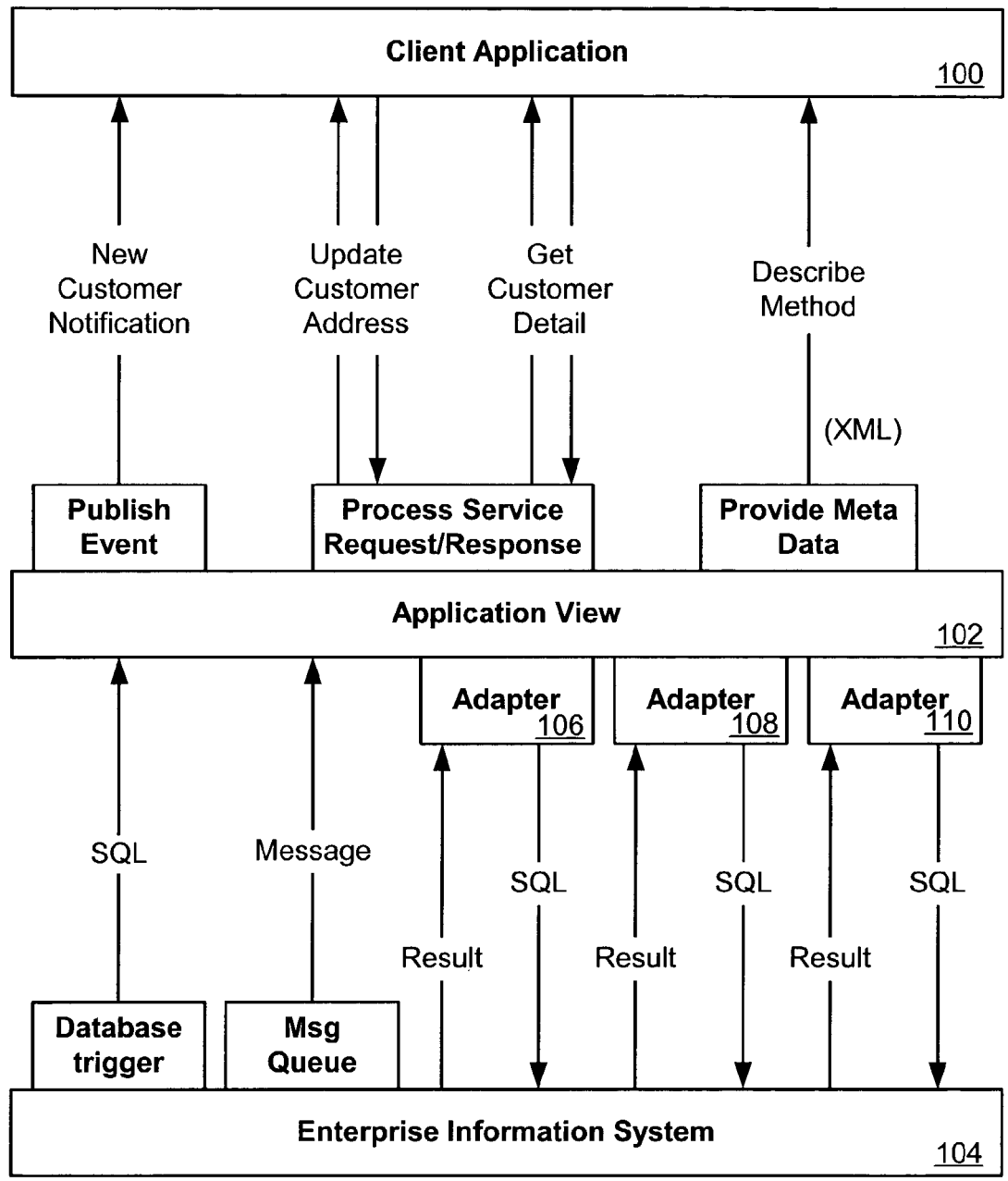
FIG. 1 is a diagram of an integration system that can be used in accordance with one embodiment of the present invention.

Application integration components can be used to integrate a variety of applications and systems, such as Enterprise Information Systems (EISs). Information technology (IT) organizations typically utilize several highly-specialized applications. Without a common integration platform to facilitate application-level integration, these applications cannot be integrated without extensive, highly-specialized development efforts.

Application integration can utilize adapters to establish an enterprise-wide, united framework for integrating any current or future application. Adapters can simplify integration efforts by allowing each application to be integrated with an application server, instead of requiring that each application being integrated with every other application.

The development and widespread acceptance of standards such as the Java 2 Platform, Enterprise Edition (J2EE) from Sun Microsystems, Inc. of Santa Clara, Calif., as well as the extensible Markup Language (XML), has laid the groundwork for a standardized approach to the development of these adapters. Perhaps the most significant of these standards for application integration is the J2EE Connector architecture. The J2EE Connector architecture provides a standardized approach for the development of adapters for all types of applications, from legacy mainframe applications, such as CICS from IBM, to packaged applications such as PeopleSoft, Siebel, and SAP. The adoption of such standards enables businesses to develop adapters that work on any J2EE-compliant application server, for example.

Integration Architecture

Application integration can build on this standardized approach in an application integration framework by providing a standards-based architecture for hosting J2EE Connector architecture-based adapters. Developers can build J2EE Connector architecture-compliant adapters and deploy these adapters, in the integration framework, to connect enterprise applications to an application server.

These adapters can be used to define business-focused interfaces to an EIS, the interfaces referred to herein as "application views" of the respective adapters. An application view can provide a simple, self-describing, consistent interface to services and events in an application. Application views can make use of an adapter for an EIS, making it possible to expose existing information systems as business services. Unlike adapters, however, an application view does not require users to have intimate knowledge of the EIS or the client interface for that EIS, such that non-programmers or technical analysts can use application views. An application view can provide a business-oriented way for business analysts to access enterprise data without worrying about the programmatic details defined in an adapter. These same users may be otherwise unable to use an adapter directly, due to a lack of familiarity with the EIS.

An application integration component directed at enterprise application integration can have several primary aspects. If the functionality of an EIS such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

Application Views

An application view can provide significant value to an application integration component. An application view can abstract away much of the complexity in dealing with an application, such as a backend EIS system. Application views can also simplify the way in which adapters are accessed. Application views can provide a layer of abstraction, for example, between an adapter and the EIS functions exposed by that adapter. Instead of accessing an EIS by direct programming a user can simply edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bidirectional communication can also be supported in adapters.

An application view can be an integral part of an integration framework when used as an interface object. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

In one example, shown in FIG. 1, adapters 106, 108, 110 can be developed that allow a client application 100 to communicate with an Enterprise Information System 104 through the use of an application view 102. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

An application view is an object, which can be implemented in one embodiment as a stateless session JavaBean. There can be a Java interface to the application view for the client application. A Java application can be custom coded to use that object, such as by passing XML in and receiving XML back. In addition, a business process management component can be included that allows process engineers to define workflows, and allows application views to be invoked as business services. In a workflow, a callout can be made to an EIS to get information such as a customer's credit record. The fact that the application view is a Java object or enterprise JavaBean can be hidden from the process and designer.

A web services interface can also be used with an application view. A protocol such as SOAP can be used to invoke a web service. Another protocol that may be used includes UDDI, a platform-independent, open framework for describing services, discovering businesses, and integrating business services using the Internet. A WSDL protocol can also be used, which is an XML format for describing network services. A web services layer can be provided on top of the application view so that any application view can be invoked as a web service.

In application integration, new application views can be hot-deployed against an existing EIS through a web-based interface. An application view is hot-deployed when it is deployed with the system running, without restarting the destination server. A new customer management tool for SAP, for example, can also be defined through a web browser. A user can also decide whether or not an application view should be deployed persistently. Persistent deployment means the application view can be redeployed whenever the application server is restarted.

Integration Framework

Application integration can utilize an integration framework, which can provide a systematic, standards-based architecture for hosting application views. Features of such a framework can include application views for exposing application functions and design-time graphical user interfaces (GUIs), such as web-based interfaces that can be used for creating application views. The integration framework utilizes adapters, instead of "hardwiring" enterprise systems together. Once an adapter is deployed for an EIS, other components and applications can use that adapter to access data on the EIS.

A framework in accordance with one embodiment of the present invention relies on XML as the standard format for messages. XML includes XSLT, a standard for transforming XML documents into other XML documents. XSLT is designed for use as part of XSL, which is a stylesheet language for XML. In XSLT, an XML document is used to specify the operations to perform on a class of XML documents in order to transform the documents' structure and content. An XSLT transformation can make use of any of the operations built into the Java programming language, or can make use of custom operations written either in Java or in native code. An integration framework allows a business process to invoke an XSLT engine in order to transform XML messages.

An integration framework can also rely on standards for transporting messages such as Java Message Service (JMS) and HTTPS. JMS is a standard API for interfacing with message transport systems. Using JMS, a framework can utilize any message transport mechanism that provides a JMS interface. The J2EE Connector architecture standard does not specify a message transport mechanism, but an application integration framework can specify such a transport mechanism.

An integration framework can be based on an existing standard infrastructure, such as an application server that supports J2EE, JMS, and the J2EE Connector architecture. Using such a standard infrastructure also provides for high availability and scalability, such as by clustering and resource pooling. The framework can provide for universal connectivity by enabling the construction of XML-based application adapters that can connect to any legacy and packaged application. An adapter development kit can be used to allow users such as customers, system integrators, and packaged application vendors to quickly develop J2EE connector architecture-compliant and integration framework-based adapters. The framework can utilize XML, which means that the same data format can be used for both within- and between-enterprise integration, since many e-commerce systems use XML as the standard message format.

An integration framework can also utilize a business-process engine to allow non-programmers to graphically construct and maintain business processes. An integration framework can implement a common model on top of the J2EE Connector architecture that is focused on business-level concepts. This model, which can consist of XML-encoded events and services, allows the management of a consistent integration environment, regardless of the interface required between adapters and their target applications. The business processes can react to events generated by applications, and they can invoke an application's functionality via services that are exposed by an application adapter.

Abstraction

As mentioned, an application view can provide an abstraction layer between the technical implementation of an adapter and the usage of the capabilities exposed by the adapter, as an application view can be a standardized, self-describing interface to an application.

In one example, a business-level view of an application's capabilities can provide a logical separation between a programmer and a business analyst. For example, this abstraction can enable a business analyst to create records in a database without having to know statements for creating database records, such as SQL statements.

To update records in a database using SQL statements, for example, a business analyst can define an application view called "UpdateRecords." A programmer can supply the SQL statements that update the database records and include those statements in the definition of UpdateRecords. At run time, UpdateRecords can be invoked by an XML message from, for example, a business process. The application view, in turn, can call the adapter and pass the SQL statements to the adapter. The adapter can access the enterprise data and return the result to the UpdateRecords application view, which can return the result in another XML message.

Defining Application Views

A user may need to define application views in certain instances and write custom code in others. Using an adapter's design-time GUI is not the only way to expose the functionality of an EIS, but can be the most convenient in certain circumstances. To support service invocation and events, application views can be defined or custom code can be written to accomplish specific functionality. In many cases, application views can be defined for each adapter to expose the application functions. In other circumstances, or for users who require more control, custom code can be written to access the resources of an adapter. For an enterprise, a combination of both methods can be used.

In general, application views can be defined for a situation where there is more than one EIS system in an enterprise, especially if there is a lack of developers who have detailed, thorough knowledge of all the systems. Application views can also be defined, for example, when an integration studio is to be used to construct and manage business processes, or where it will be necessary to update the parameters of an adapter or one of its processes.

An application view can enable a user to define integration points by browsing fields and data for a specific application. By defining application views, a user can define integration endpoints, such as for a customer management system, sales, order management system, or purchase order management system. A user can create an application view for each business use, and can deploy and manage these application views using an integration framework component.

Before attempting to define an application view, certain prerequisites may need to be satisfied. First, an appropriate adapter should have been developed, such as by using an ADK. Certain application views can only be created and configured for existing adapters. It should also be determined which processes need to be supported by the application view being configured. Any required processes can determine the type(s) of services and events to be included in an application view. This can require, for example, gathering information about the application's business requirements from a business analyst to be used with certain business processes. Once the necessary processes are determined, the appropriate services and events can be defined and tested.

When defining an application view, an interface such as an XML-based interface can be created between an application server and a particular EIS application within the enterprise. Once the application view is created, a business analyst can use it, for example, to create business processes that use the application. For an adapter, any number of application views can be created, each with any number of services and events.

Figure 2:
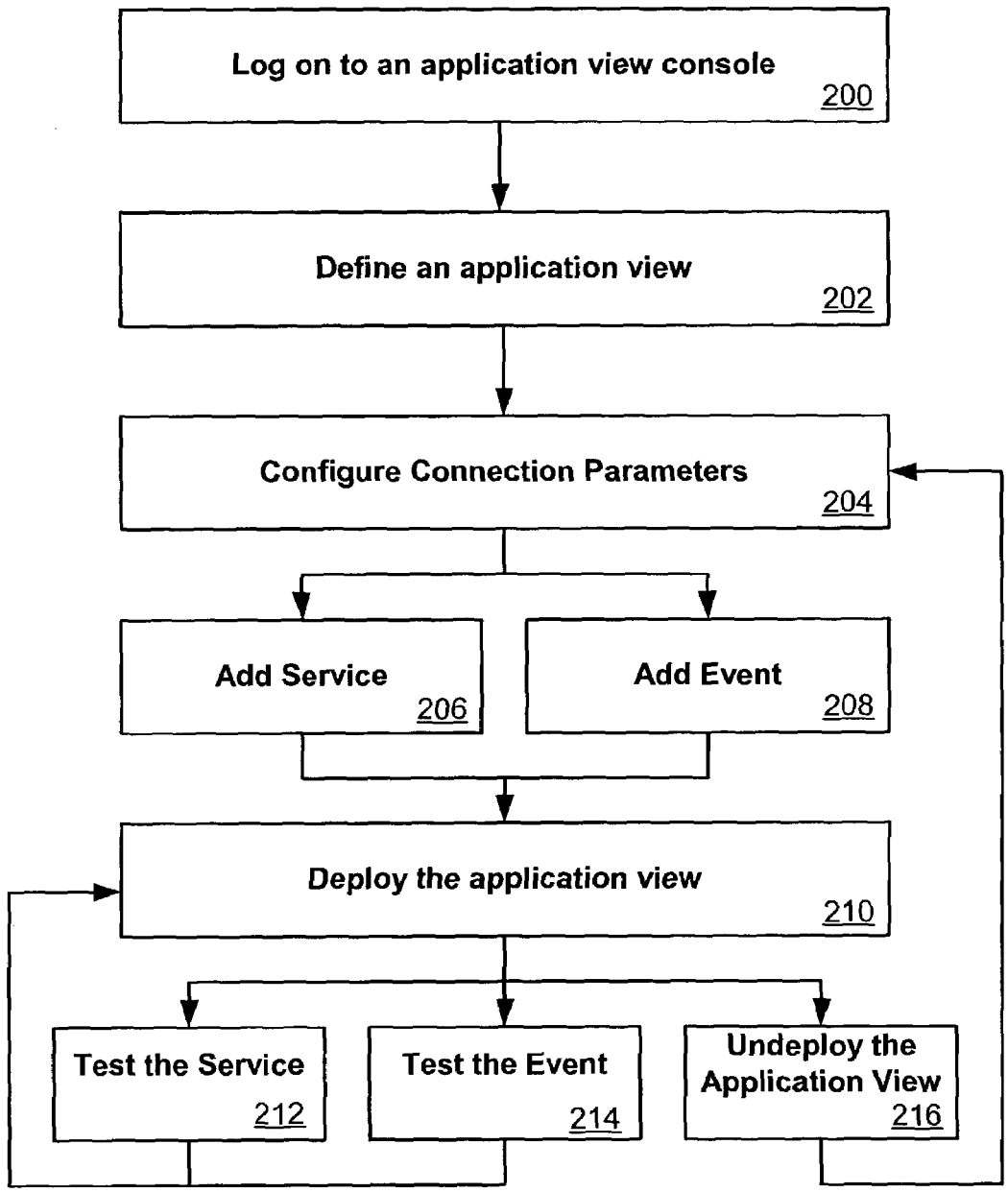
FIG. 2 is a flowchart showing a method for creating and deploying an application view that can be used in the system of FIG. 1.

FIG. 2 shows an overview of a method for defining an application view in accordance with one embodiment of the present invention. Although the method is described using an application view console, it should be understood that any other appropriate user interface can be used that allows the entering and/or selecting of data and/or options. First, a user logs on to an application view console 200. The user can select an option to add or create an application view through the console in order to create an application view for the appropriate adapter. This new application view will enable a set of business processes for this adapter's target EIS application. The user can define the application view as necessary for the adapter, EIS, and/or business processes 202. The user can enter and configure application connection parameters 204. The information can be validated by the console, and the application view can be configured to connect to the specified system. A user can add events 208 or services 206, and can define the appropriate events and services for this application view. The application view can then be deployed 210 on the application server so other entities can interact with the application view, at least according to any security settings. The services can be tested 212, and the events can be tested 214, to make sure they properly interact with the target EIS application. Once the services and events are tested and functioning, the application view can be used in workflows. The application view can be undeployed 216 if necessary to reconfigure connection parameters or add services and events.

One approach to defining and maintaining application views can be shown using the example of an EIS adapter for a hypothetical database EIS called simply "DBMS." When application views are created for an enterprise, the application view screens may look different than the screens for a different enterprise. An application view's adapter can determine the information required for each application view page, and each enterprise can have its own specialized adapters.

The first step in creating this new application view is to log on to an application view "Console" page. The Console can display all the application views in an application integration environment, such as may be organized into folders. To log on to the Console, a user can open a Web browser window using a URL for the appropriate application view Console. After logging on to the Console and navigating to a folder or creating a new folder, a user can click add or define an application view. A "Define" page can then be displayed. In some embodiments, an application view may not be moved to another folder once it is defined.

In a "Define" page can be fields where a user can enter a name for an application view, such as a name that describes the set of functions performed by this application. Each application view name can be unique to its adapter, and can include both letters and numbers. In a description field, a user can enter any relevant notes. These notes can be viewed by users when they use this application view in workflows, such as workflows using business process management (BPM). From a list of associated adapters, a user can select an adapter to use to create this application view.

Next, a user can navigate to a page that allows the configuring of the appropriate connection parameters. Here, a user can define the network-related information necessary for the application view to interact with the target EIS. This information can be entered once per application view.

After creating and configuring an application view, a user can add services that support the application's functions. While the application view is open, a user can navigate to an "Administration" page. Here, a user can add a service, giving the service a name that describes the function performed by this service. Each service name can be unique to its application view. A user can enter any relevant notes in a description or similar field. These notes can be viewed by users when they use this application view service in workflows using BPM. When finished, a user can add an event to an application view by following similar steps to adding a service.

Events and Services

An application view can support events and services for an application through an underlying adapter. These events and services can be established for a particular use, such as for a particular business process. In one example, an "event" enables messages generated by an application to be managed following a publish/subscribe model. In this model, users can "subscribe" to receive messages that are "published" by an application. Each message can be referred to as a publication event. Such a model can be implemented through multicasting, for example.

A "service" can act as a business function that can be invoked by a user. Service invocations can cause messages to be sent to an application following a request/response model. This model can differ from a publish/subscribe model, in that messages are only sent when requested by a user. This can be implemented, for example, using a point-to-point messaging system. Both events and services can be passed through the system as XML documents.

A service can constitute business logic within an application that an application view exposes for reuse. When an application view receives an XML document containing a request to invoke a business service, the application view can invoke that functionality within its target application and return an XML document that describes the result. Each service on an application view can represent a single function, such as a single, logical business function, within a target application. A service can take request data, such as in the form of an XML document, and return response data, which can also take the form of an XML document. Services can represent bi-directional communication between an application view client and a target application. Services can allow for synchronous or asynchronous communication between applications.

Metadata

One of the key characteristics of an application view in accordance with one embodiment is the ability to provide metadata to describe a procedure for interacting with an EIS system. An application view can inform a client application of all available services that can be utilized. For a customer management example, these might be services such as "GetCustomerDetail" or "CheckOrderStatus." An application view can provide metadata about itself, such as in the form of XML schemas.

An application view can also include self-describing metadata. An application view can use an XML schema as metadata to describe XML information for events, service requests, and responses. This metadata can help a user to understand the data requirements of the event or service of interest.

Since capabilities of an application view can be represented as metadata, an application view can be created on one system and deployed on another. An application view can provide a logical separation between the programmer and a business analyst, for example. The business analyst can create records in a database without having to know SQL, or can request information from SAP without having a technical understanding of SAP. An application view can provide a consistent data representation, regardless of the underlying implementation used by an adapter. For example, each EIS might have an XML interface. For every interaction available to a client there can be a corresponding XML schema that describes the criteria for a valid XML document for that interaction. An application view can allow enterprise integration points to be organized by business semantics, such as Customer Management, Order Processing, and Inventory Control.

It should be noted that at least three features can be exposed to application view clients in certain situations, including outbound messages, inbound requests that return a message, and a way to view the description of any messages that can be sent outbound or processed inbound. Once the possible connections for an adapter are exposed, the application view can hide the technical details from a business analyst. The adapter can be responsible for making the transition from the EIS proprietary connection to methods the application view is able to use.

Common Protocol

An application view can take advantage of a common protocol. A common protocol can help make application integration possible, as each application only needs to be integrated with the common protocol rather than with every other application. With a common protocol, applications can communicate using a standard language, such as XML. One such common protocol can be based on events and services that are represented by XML documents. Adapters can expose an application's functionality and data formats as events and services in an XML format via the application view so that they the events and services be used by all clients of the integration service.

Figure 3A:
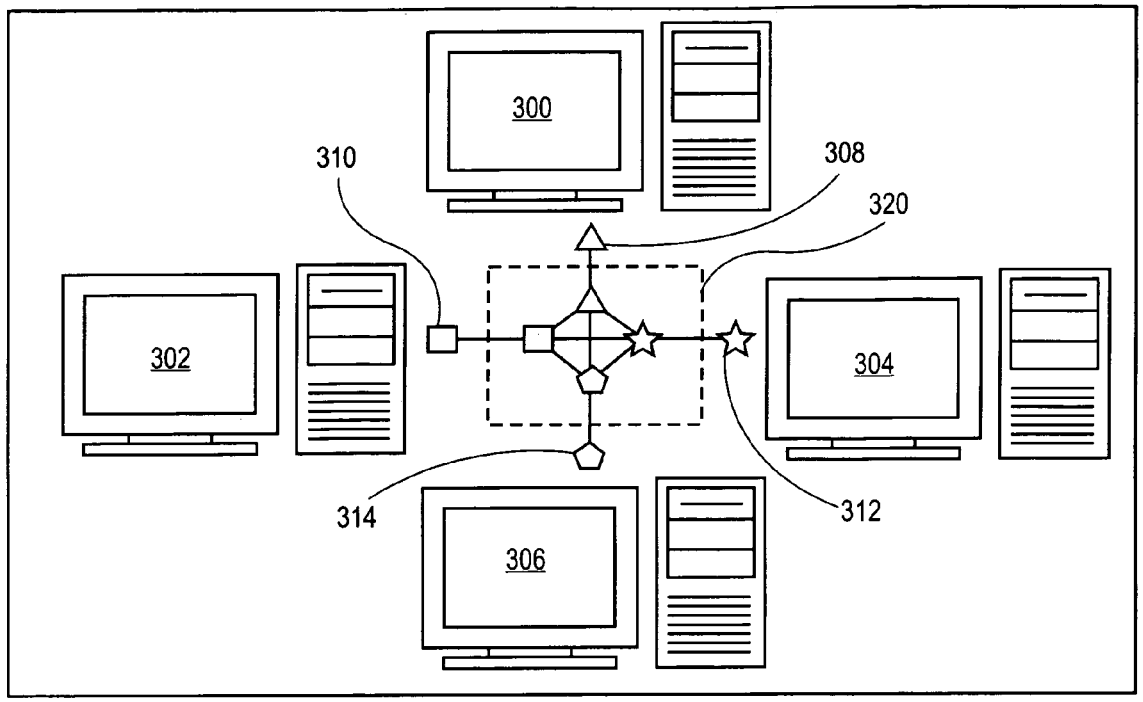
FIGS. 3(a) and 3(b) show computer systems communicating with and without a common protocol.
Figure 3B:
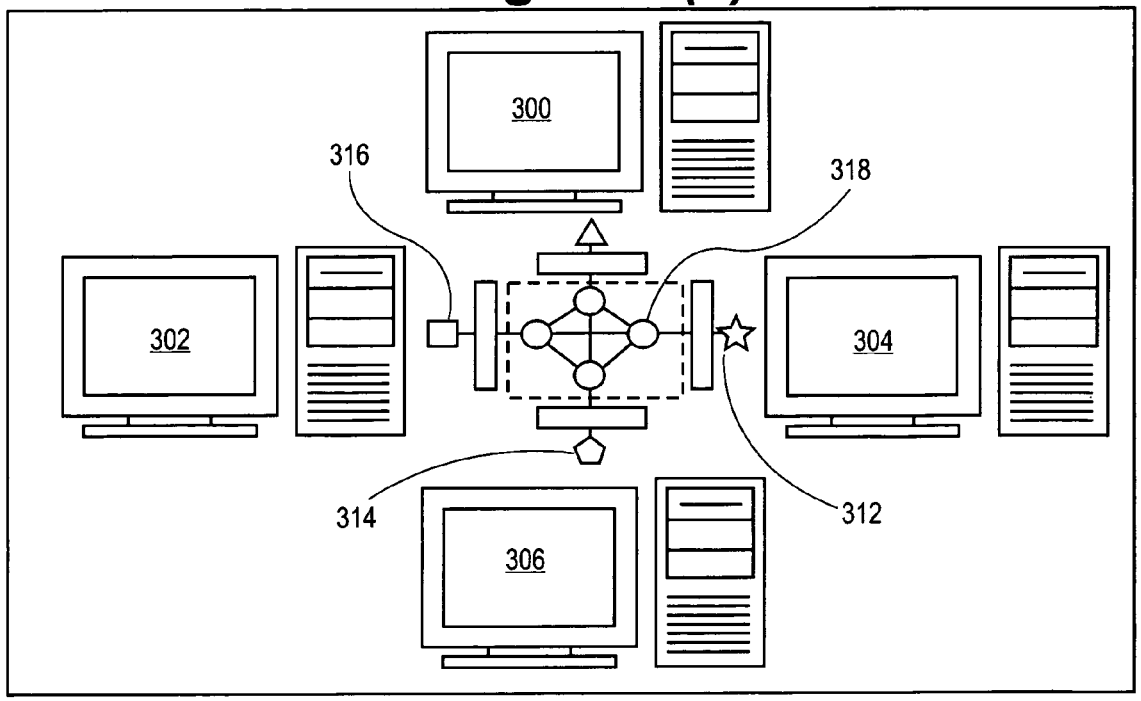

Without a common protocol, there might be a number of different languages that would need to be translated between each other. FIGS. 3(a) and 3(b) illustrate application integration with a common protocol versus application integration without a common protocol. In FIG. 3(a), four computer systems 300, 302, 304, 306 are shown communicating without a common protocol. In this situation, a central hub 320 must handle protocol 308 for computer 300, as well as protocols 310, 312, and 314 for computers 302, 304, and 306, respectively. The hub 320 must also handle all byte formats, character encodings, and type casting for each of the protocols 308, 310, 312, 314.

In FIG. 3(b), an integration framework provides a common protocol 318 for application integration on top of the J2EE Connector architecture. This protocol 318 can be supported via an application view 316, and can consist of events and services encoded as XML documents. Through the use of application views 316, each computer system 300, 302, 304, 306 can communicate with the computer systems using a common protocol, or canonical protocol, without having to understand the other protocols. Further, the central hub does not need to handle multiple protocols 308, 310, 312, 314, but can deal with only the common protocol 318. Each of the application views 316 can enforce a consistent data format and consistent behavior in the integration framework.

Figure 4:
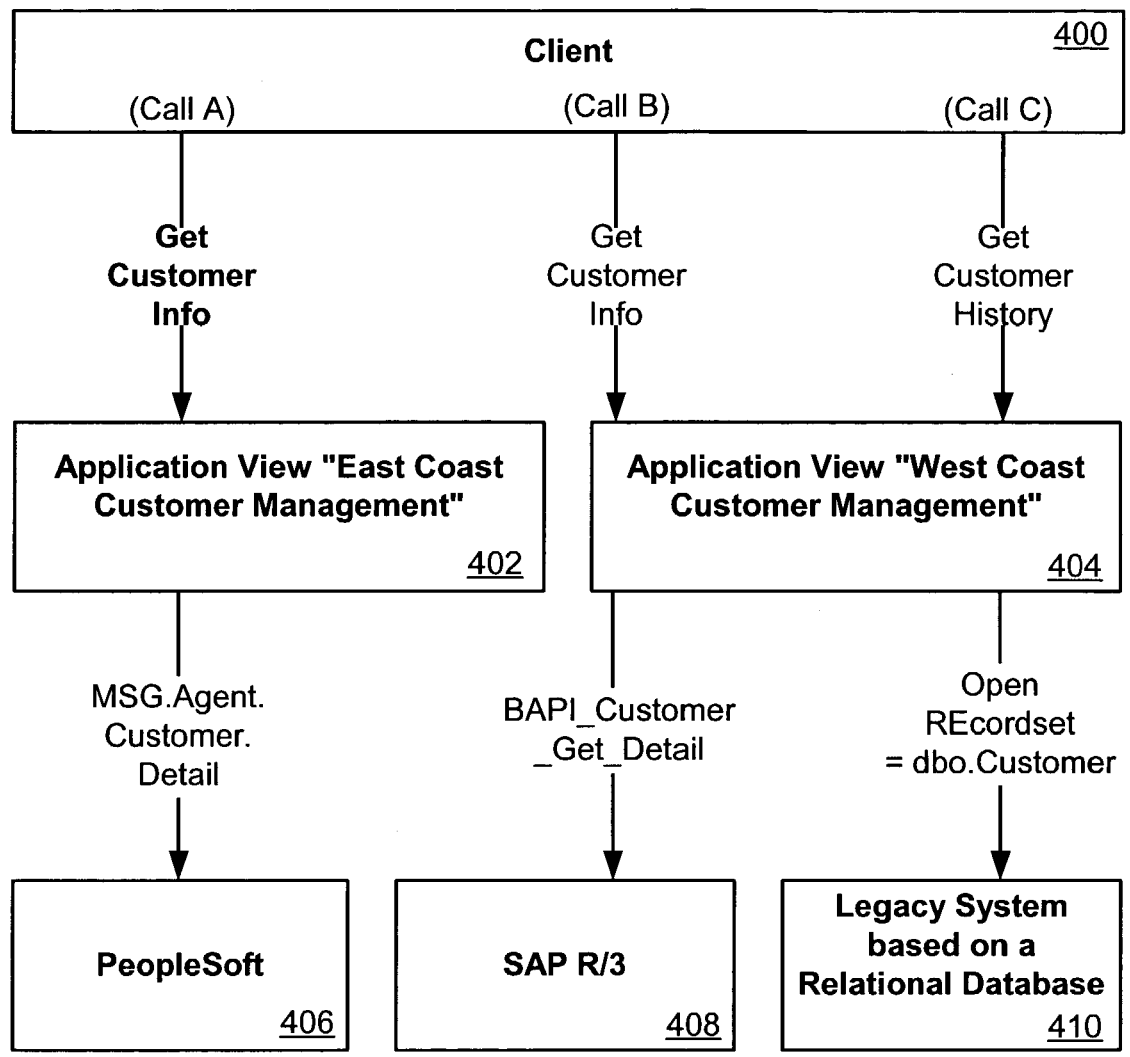
FIG. 4 shows a client using application views to make request into various systems.

Requests to an application view can be made in XML, even though a request made to a target application can use SQL or direct API calls. For example, as shown in FIG. 4, a client 400 can make calls to three separate applications 406, 408, 410 through two separate application view components 402, 404. A request to one of the application views 402, 404 does not need to address any login information. In call A and call B, both calls are requesting the same information, as call A to the "East Coast" application view 402 is attempting to get customer information, as is call B to the "West Coast" application view 404. The actual data, however, is retrieved from PeopleSoft 406 and SAP 408, respectively. The client 400 initiating the call is not aware of which application is actually processing each request. In calls B and C, both calls are associated with the same application view 404, but each request is handled differently as call B to get customer information gets the information from SAP 408, and call C to get customer history gets the information from a legacy system 410. This allows a logical grouping of information to be handled by a single application view 404. A client 400 or user can see a subset of the functionality available from the target application, and the functionality can be grouped in a form that is more useful.

An application view can be the middleman that translates XML messages into the necessary interfaces required by an EIS, and vice-versa. Additionally, an application view can provide an introspection feature so that a client interested in using the application view can determine which capabilities are available, as well as and the type of XML documents each capability will accept and return.

In an application view, there can be consistent interaction. Outgoing messages can be generated by events and incoming messages can be processed by services. An application view can be dynamically implemented and configured by metadata. There may be no code generation needed. This approach allows for a fluid adaptation to business events and changes. There may be no need for compilers and no need to worry about compatibility, such as with new versions of Java.

Graphical User Interface (GUI)

An integration framework can provide a way for developers to provide a design-time GUI for each adapter. A design-time GUI can provide a way to create application views; to add services and events to application views; and to deploy, test, and edit application views. An application view console can be included in a GUI to help a user access, organize, and edit all application views in an enterprise. An application view console can be used to create new folders and add new application views to the folders. These new folders can allow a user to organize application views according to a particular navigation scheme, regardless of the adapter being used by the application view.

An application view can be removed when it becomes obsolete or the application is retired. An application view can be removed in some embodiments only if certain conditions are true. One such condition is that the user has undeployed the application view. Another condition is that the user is logged onto the application server with the appropriate write privileges. To remove a folder, a user must first remove all of the folder's application views and sub-folders. The user can then navigate to the folder in the Console and remove or delete the folder.

Application integration configuration data can be stored in the same repository as data for business process management (BPM). Therefore, the same tools can be used to migrate application integration when migrating BPM data. However, there can be some special considerations for migrating application integration data and deploying the migrated data in the target environment. Migrating application integration data can be straightforward between application server domains and an EIS when instances do not change. However, if the EIS instances change, special procedures may need to be followed in order to ensure a working solution in the target environment.

In some instances it may be desirable to migrate application integration data between application server domains when the EIS instances involved do not change. An example of this type of migration involves moving application view definitions between repositories for different domains of application integration. In this case, only the application integration domain changes, but the target EIS instances referred to in the application views remain the same. Here, an import/export utility can be used to make migrating data simple. For BPM, this can involve exporting a package from BPM in the source domain, and importing that package into BPM in the target domain.

XML

The Extensible Markup Language (XML) is an industry standard for a self-descriptive, extensible, text-based format used to encode data. XML provides a general-purpose data format that can be extended for use by any vertical application. Because XML was specifically developed for the Web, it is rapidly being adopted as the language for cross-enterprise data interchange. Because XML is general purpose, it makes sense to use it as the language for communication between two or more groups that have different native languages, for both internal and external enterprise integration. By using XML, an enterprise can have a common format for both internal and external data that can be used to facilitate cross-enterprise integration. The first wave of application integration lacked a common representation for data and metadata. XML provides both.

An application view can accept XML documents and return XML documents for services, and can publish events as XML documents. This functionality can be useful in abstracting the complexity of the EIS, even though most EIS systems do not understand XML or use it as a native data format. XML is an easier format to use in integration scenarios. An application view and adapter can work together to present an XML interface of an EIS.

In an integration environment, virtually all messages can be sent as XML documents. For each service, application views can require XML request messages and provide an XML response message. When events are generated, registered event listeners can receive event information as XML. The application view can rely on its adapter to translate the EIS-specific format to, and from, XML.

Using application views can make it possible to expose existing enterprise applications as business services that accept XML data as input and that return XML data as output. Using XML as the common format to represent enterprise data makes it possible to treat different systems in similar ways. One basic difference between integrating with an SAP system and a Siebel system, from the perspective of a business analyst, is the content of the XML messages. The technical details of the system being integrated can be made transparent, enabling the business analyst to focus on the business service being called to solve a business problem.

XML Schemas

Each application view can use an XML schema as metadata to describe the XML data for events, service requests, and service responses. This metadata can help users understand the data requirements of any application view event or service. An application view can provide its clients with the XML schemas that describe the data requirements of the services that the application view exposes.

J2EE Connector Architecture

The lack of widely adopted standards within the application integration market is being addressed by the introduction of standards such as the J2EE Connector architecture and the Java Messaging Service (JMS). JMS provides a standard programming interface to message transport mechanisms. The J2EE Connector architecture provides a standard for application adapters. A J2EE Connector architecture adapter can run within any integration server that supports the J2EE Connector architecture standard.

The adoption of standards such as the J2EE Connector architecture allows packaged application vendors to construct application adapters that will work within any compliant application server. However, the architecture is a new standard that only addresses low-level integration issues. For example, the connector architecture is unidirectional, allowing for synchronous communication from an integration server to an external application. The connector architecture does not, however, specify how an external application can asynchronously send data to an integration server. It also does not provide any common or required interface for application adapters, nor specify how data passed between adapters and applications are encoded.

Basic services, such as events, receiving XML, returning XML, and self-describing available services/events, are not addressed in the J2EE Connector architecture. This can be an advantage to using an application view in accordance with one embodiment of the present invention.

The J2EE connector architecture also fails to address application integration at the business level. An application framework in accordance with the present invention adds value to the connector architecture by providing support for business process-level integration and bi-directional data flow between the framework integration server and external applications. A business-level view can be implemented on top of the connector architecture that consists of events and services. An event can be a message delivered asynchronously via JMS from an application, such as by an application adapter, to the framework server. A service can be a function provided by an application that any business process can invoke via the application's adapter.

Business Process Management (BPM)

One way to use an application view in an enterprise's business processes is to design a workflow in BPM. BPM can provide a GUI-based environment for designing business process workflows. These workflows can include application view services and events defined using application integration.

There can be at least four ways to use an application view in a workflow using BPM. In a first scenario, a task node is set up to call an application view service. In a second scenario, an event node is set up to wait for a response from an asynchronous application view service. In a third scenario, a workflow is created that is started by an application view event. In a fourth scenario, an event node is set up to wait for an application view event. If BPM is not used, an alternate way to use an application view in an enterprise is to write custom Java code to implement a business process.

For each business process implemented, it will be necessary to decide on an implementation method. While any business process can be implemented as a workflow by using BPM, a business process should only be custom coded if it is simple and/or specialized.

In general, BPM should be used to implement a business process in certain situations. One situation in which it can be advantageous to use BPM to implement a business process occurs when implementation would require complicated error management, persistent processes, and sophisticated conditional branching. For example, if a business process receives events, selects only a subset of the events, performs complex branched actions, then generates many complex messages and sends the messages to a variety of application server clients, it can be advantageous to use BPM to implement the business process.

BPM can also be used when only occasional changes need to be made to the business process. BPM can reduce the number of compile/test/debug cycles. BPM can also be used when, as in most organizations, developers are valuable and scarce.

Certain prerequisites can be met before a user invokes an application view service or receives an application view event in BPM. First, a user can have created an application view and defined services and events for the application view. Also, the application view and its adapter can be functional and saved. If the user is planning to call application view services and events from a running workflow, the application view should be deployed as well. Both BPM and application integration should be running, and the application integration plug-in should be loaded. The user should have information about any required business logic for the workflows being defined. This information can come from a business analyst, for example. Also, a workflow template definition can be open.

After creating the necessary application view services and events for an enterprise, a user can use those application views to execute business processes. BPM can be used to design business process workflows that use the application view services and events. BPM can provide a GUI-based environment for designing business process workflows. These workflows can include application view services and events defined using application integration.

There are at least four primary ways to use application view services and events in BPM. One way is to set up a task node to call an application view service. Another say is to set up an event node to wait for a response from an asynchronous application view service. Another way involves creating a workflow started by an application view event. Finally, an event mode can be set up to wait for an application view event. These scenarios can be used in combination with each other to create personalized workflows.

Event Router

An application programming interface (API) can be used to interact with XML documents, such as to set basic data on an XML document. If a new customer is in an EIS system, there can be information related to that customer such as the customer's name and address. An event generator can do a "post" event, which posts the event to an event router. The event router can transfer the event from an event generator to an application integration server so the application integration server can notify listeners registered for that event. The event router can know how to communicate with the application integration server.

An event router can sit on a different server than the main server or application server. This may be a common scenario, as something tightly coupled to an SAP system may be kept close to the SAP system instead of on the main server.

An event router can publish an event message over to the application integration server with a "publish" call of "event message." This can then be published to the application view topic. Once the topic receives the event, it can notify the registered event listener of the client. This can all be based, at least in part, on JMS/XML standards.

Application View Life Cycle

Figure 5:
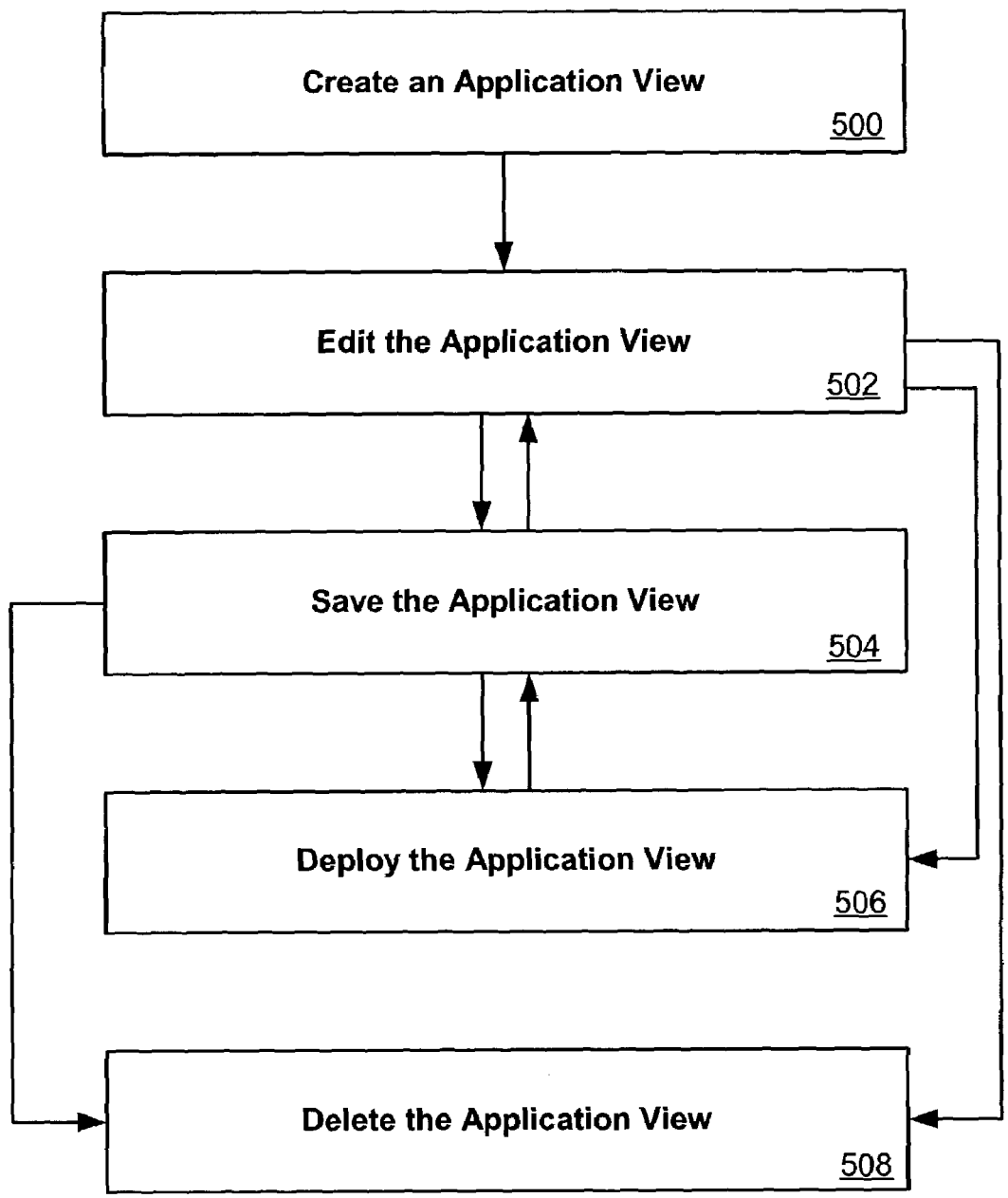
FIG. 5 is a flowchart showing the lifecycle of an application view component that can be used in the system of FIG. 1.

FIG. 5 is a diagram showing the life-cycle of an application view in accordance with one embodiment of the present invention. Initially, an application view needs to be created 500. A user can create an application view within a parent namespace and provide a name for the new application view. Once an application view exists, it can have edits that need to be made and saved to a repository 502. The state of the in-memory object may not yet match the persistent state of the object in the repository. From here, a user can save the application view 504 and/or deploy the application view 506, which can automatically save. Alternatively, the user can ask to delete an application view 508 and confirm the request. A user can edit an existing application view, for example, by picking one from the namespace browser and indicating that the application view is to be edited. A transition can occur if the user asks to edit the application view, in which case the application view is un-deployed after the user is prompted and confirms.

An application view can be available for use by runtime clients. The application view can have a container with allocated resources for the application view that can service requests for the application view. Runtime clients can obtain instances of this application view from the application view container, and invoke its services and listen for its events. Other steps in the life cycle of an application view include defining the application view and using the application view. When defining an application view, communication parameters can be configured before services and/or events are added. The application view's services and events can expose specific functions of the application. The communication parameters of the application view can govern how the application view will connect to the target EIS.

Defining an application view can include tasks such as entering a unique name for the application view and configuring parameters that establish the network connection between the application view and the application itself. Other tasks can include configuring parameters that establish the network connection between the application view and the application, as well as configuring parameters specific to the application, parameters used for load balancing by the application view, parameters used for load balancing by the application view, and parameters used to manage the pool of connections available to the application view. Another task can involve defining security privileges for users of the application view.

After defining an application view, it can be deployed on an application server. Deployed application views can be used to implement an enterprise's business processes in a business process workflow. After using an application view in a business process workflow, the end result is a deployed electronic representation of that enterprise's business process. The workflow can specify how applications interact with each other to accomplish the business processes. The application views can perform the transactions themselves.

When defining an application view for an adapter, an XML-based interface can be created between the application server hosting the application view and a particular EIS application. Defining an application view can involve at least a few basic steps, including naming and configuring connection parameters for an application view. Other steps can include adding services and events to an application view, as well as testing services and events.

Editing Application Views

An existing application view can be modified to account for definition errors, incomplete definition, change in business purpose, or change in underlying application connectivity. The resulting application view can satisfy the business data requirements and can perform the proper interaction with applications. In order to edit an application view, it can be necessary to first identify the application view and verify that it exists. The technical analyst can enlist the help of a subject matter expert to assist in defining the application view by offering application expertise, and possibly by modifying the application or its metadata to meet the needs of the application view. It is necessary, in some embodiments, that the adapter for the application selected by the technical analyst has been installed, and that the appropriate JSP-based design-time GUI has been installed. The server hosting the adapter and the design-time interface should also be up and running.

The basic flow and alternate flows can assume that the business analyst, technical analyst, and subject matter expert are all interacting during the creation/definition of the application view. This often may not be the case. In the case that each user is taking a turn reviewing the current state of the application view, the flow of events can take the form of multiple passes through the flow of events, with each pass representing only the single user interactions.

To edit services and events for an application view, a technical analyst can browse a metadata tree of the application and identify the proper metadata to represent the event or service. The technical analyst can then create an event or service that is specific to the adapter and its design-time interface capabilities. An event or service definition can be created and added to the application view. What the definition contains can be specific to the adapter, but the definition can contain enough information for the event adapter to properly generate events of the requested type at runtime.

System Example

Figure 6:
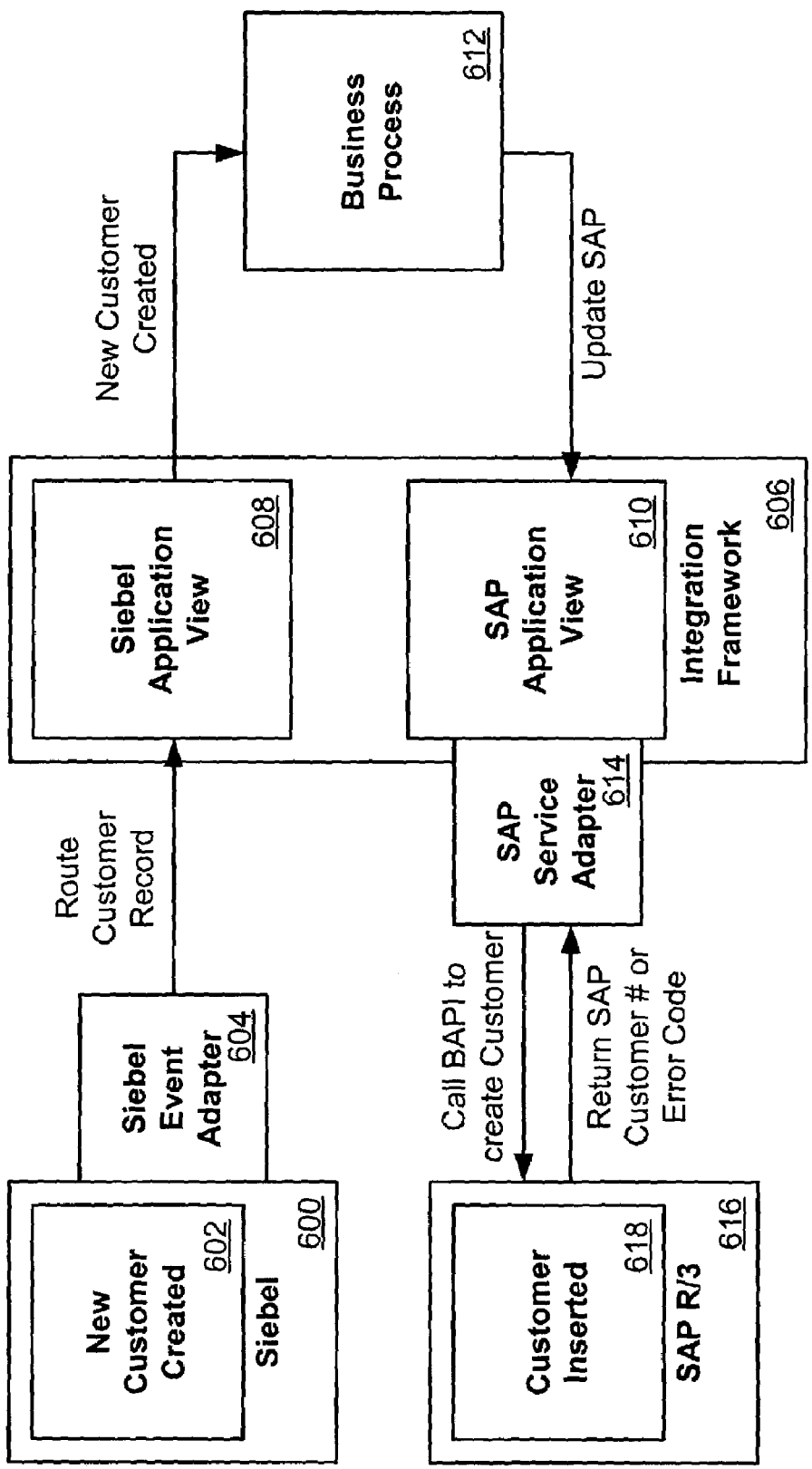
FIG. 6 is a diagram showing a system for integrating Siebel and SAP systems in accordance with one embodiment of the present invention.

The simple example of FIG. 6 shows the interrelation of some of the features described above. This figure shows an example situation that could arise which would involve adding customers to an SAP instance 616 that were created originally created in a Siebel system or instance 600. In this example, a new customer 602 is created in Siebel 600. Through SiebelCode, the Siebel-specific event adapter 604 is notified and is passed the customer information. The event adapter creates an XML-based object containing the customer information and notifies the Siebel application view 608 of the event. The Siebel application view 608 then passes the event to the business process 612. The business process 612 can determine that the customer information needs to be replicated to an SAP system 616. The business process 612 transforms the Siebel XML representation of a customer to an SAP XML representation. The business process then invokes a service provided by the SAP application view 610, which can be part of the same integration framework 606 as the Siebel application view 608. The SAP application view 610, in turn, calls the SAP service adapter 614 and passes the XML message, which is now in a format that the SAP adapter 614 can understand. The SAP adapter 614 can convert the XML message to a specific BAPI (business application programming interface) and can call the SAP instance 616. SAP 616 can process the request, insert the customer 618, and return the customer number assigned by SAP 616.

An application view object can be created with a name that reflects its business purpose and within a namespace that describes its place within the organizational structure of the business. The resulting application view can satisfy the business data requirements and can perform the proper interaction with applications. Users of the application view can include business analysts, technical analysts, and subject matter experts. A business analyst can decide what the business purpose of the application view will be. The technical analyst can decide which application is best suited to the purpose for the application view. The technical analyst can enlist the help of the subject matter (application) expert to assist in defining the application view by offering application expertise, and possibly modifying the application or its metadata to meet the needs of the application view. The adapter for the application selected by the technical analyst should already be installed and the appropriate JSP-based design-time GUI installed. The server hosting the adapter and the design-time interface should also be up and running before creating a new application view.

In a basic flow, a technical analyst opens a web browser and points to the URL for the adapter design-time interface. The technical analyst and business analyst decide which business organization the application view belongs under, and verifies that an appropriate application view namespace exists. This can be done using the namespace browser tree on the home page of the adapter design-time interface. If no appropriate namespace exists, it can be created using the namespace browser.

The technical analyst and business analyst agree on the name for the application view. The name can reflect the business purpose for the application view. The technical analyst can create a new application view within the identified namespace and give it the agreed-upon name. The business analyst gives a brief description of the application view's business purpose and the technical analyst types it into the description field of the new application view. The set of events and services for the application view are reviewed and edited, if necessary. The technical analyst can then save the new application view. At this point, the application view can be saved for later use, tested, or deployed into the runtime application view engine.

Adapters

As discussed above, adapters can be developed as service or event adapters. A service adapter can invoke a specific function in the enterprise system to which it is connected. An event adapter can propagate information from the enterprise system to the integration environment. For each application view, businesses can add any number of services and events to an application view definition to support specific types of transactions between an application server and the target enterprise system. Because an adapter can use XML to translate an application's data format, business analysts do not need to understand the format. If a business analyst wants to use an adapter, it is only necessary to know how to define and use application views. Best of all, because all adapters can use a similar Web-based interface for defining application views, it can be easy to learn to use current and future adapters. XML can make application integration smooth both for developers and business analysts.

The J2EE specification does not currently provide guidelines for an EIS to initiate communication with the application server or client. Application integration can provide this capability through the user of event adapters. Another important feature of an application view is the ability to support bi-directional communication. The J2EE specification does not currently provide guidelines for an EIS to initiate communication with the application server or client. This capability can be provided by an event adapter. When added to an application view, each event responds to a particular enterprise application state. When a particular event is triggered, the application view can extract data about the event from the enterprise system and propagate the data in an XML document to the integration environment.

Similarly, when added to an application view, each service can represent a particular function in an enterprise system. When an application view receives an XML document that maps to a particular server, it invokes the corresponding function in the enterprise system using the service adapter. The enterprise system can in some embodiments send a response to the service.

Business Approach

If a business analyst or technical analyst defines an application view using an adapter, the application view can be customized for a specific business purpose. The business purpose can be defined by the business analyst. For example, if defining a "customer management" application view on an adapter for a Customer Relationship Management (CRM) system, only the services and events related to customer management can be added. Application views can be created that are as inclusive as necessary. Because application views can be customized for a specific business purpose, application views can work much better than the "one size fits all" approach used by many other enterprise application integration systems.

The business-level view of an application's capabilities can provide a logical separation between the programmer and the technical analyst. For example, this abstraction can enable a technical analyst to create records in a database without having to know SQL.

Deploying Application Views

An application view can be deployed when there has been at least one event or service added to it. An application view may need to be deployed before its services and events can be tested, as well as before the application view is used in an application server environment. Application view deployment can place relevant metadata about its services and events into a run-time metadata repository. Deployment makes the application view available to other application server clients. Business processes can then interact with the application view.

To deploy an application view, a user can open an application view console and select a "deploy" option from an application view administration page. To enable BPM or other authorized clients to asynchronously call any existing services of this application view, a user can enable asynchronous service invocation. An entity that calls an application view service asynchronously can continue its process without waiting for a response from the service. If this application view has events, a user can enter the URL of the adapter's event router. A user can also enter a minimum number of connection pools to be used by this application view, such as for example "1." Similarly, a user can enter a maximum number of connection pools. In a "Target Fraction of Maximum Pool Size" or similar field, a user can enter the ideal pool size, such as may be measured from 0 to 1.0. For example, a value of "0.7" could be entered. If the maximum pool size is 10 and the target fraction is 0.7, this means the adapter will perform load balancing to attempt to maintain the connection pool size at 70% of the maximum, which in this case means 7 connections. To automatically delete unused connections, a user can select an option that will allow the pool to shrink.

In a "Log Configuration" area of the Console, a user can select options according to logging preferences, such as logging errors and audit messages; logging warnings, errors, and audit messages; logging informationals, warnings, errors, and audit messages; and logging all messages. If necessary, a user can restrict access using J2EE or other appropriate security. An application view "Security" page can be included in the Console, which can be used to grant or revoke a user's or group's read and write access to this application view. When finished setting up permissions, a user can choose to apply the changes. The user can also choose to deploy the application view after any changes.

An application view can be undeployed, for example, when a user wants to edit its connection parameters, add services and events, or disable clients from using the application view. A user can choose to display a "summary" page for the application view. To undeploy the application view from the application server, a user can select an "undeploy" option.

When defining an application view, a user can configure its connection parameters. After adding and testing services and events, a user may want to reconfigure the connection parameters or remove services and events. To edit an existing application view, a user can open the application view and click on the "summary" option, or simply display an application view "Administration" page. From here, a user can reconfigure the application view's connection parameters or add services and events.

Synchronous Approach

In order to call an application view synchronously, a user can select a "synchronous" option from the appropriate application view console A node that synchronously calls a service can be configured to wait for a service to return a response document before the workflow can continue. If the node were to asynchronously call a service, the workflow would be able to continue. For synchronous services that require storage of the response, a user can select a predefined XML variable, such as from a "response document variable" list. When BPM receives the response from the application view service, the response document variable can store the response. If a user does not care about the response data, the user can leave this field empty.

If no suitable XML variable exists, a user can select an option to create a new XML variable. If it is necessary to examine the XML schema of the response document, the user can view the response definition.

Asynchronous Approach

For asynchronous services, such as may require storage of the request ID, a predefined string variable can be selected from the application view Console. If no suitable string variable exists, a "variable properties" dialog box can be opened where a new string variable can be created. When a task node is set up to call an asynchronous application view service, the result can be returned to BPM. The workflow can identify this response using the selected request ID variable. To set an event node to receive the response, the same request ID variable should be used for the event node.

A user may wish to set up an event mode to wait for a response from an asynchronous application view service. In a workflow, whenever an action calls an application view service asynchronously, the application view service will return a response. Normally, if the user wants to know about the response, the user may want to set up a corresponding asynchronous event node to wait for the response. To configure an asynchronous event node to wait for a response from an asynchronous application view service, an event node can be created with the event node being set to wait for an event, such as an event of type "Async Response."

There are at least two primary methods that can be used to set up the event node to receive the asynchronous service response in this embodiment. In a first method, a user can select a "response document" option. When using this method, a user can receive an asynchronous service response by selecting the request ID variable and a response document variable. The request ID variable is a string and the response document variable is of type XML. A second method uses an "asynchronous variable" option. When using this method, the asynchronous service response can be received by selecting the request ID variable and an asynchronous service response variable. The request ID variable is a string and the asynchronous service response variable can be of a type such as "AsyncServiceResponse." A preferred method may be the response document method, as it can provide a universal means of receiving both asynchronous and synchronous responses. When using the response document method, an XML document can be received regardless of whether the response is asynchronous or synchronous, and it will not be necessary to query the value of the asynchronous service response variable.

A response document variable can be used to receive asynchronous service responses whenever possible. Whenever an "event properties" dialog box is set to wait for an event of the asynchronous response type, a user can choose to use an asynchronous variable to receive the response. If an asynchronous response event node is edited that was previously set up to use an asynchronous service response variable to receive the response, then two options can be displayed in an event properties dialog box: an asynchronous variable option and a response document option. In this case, a user can select one of the two methods to receive the service response.

If an existing asynchronous response event node is edited that does not use an asynchronous service response variable or a new asynchronous event node is created, an event properties dialog box can display a dialog box that will allow a user to set a response document to receive the service response.

Although this scenario does not handle errors returned in the application view service response, a user may want to handle errors in specific user workflows. To handle asynchronous service response errors in these workflows that may use, for example, an AsyncServiceResponse variable, a user can use features included in an application integration plug-in. An application integration plug-in in accordance with one embodiment of the present invention can include a variable type such as AsyncServiceResponse and functions such as AIHasError( ), AIGetErrorMsg( ), and AIGetResponseDocument( ).

To set up an asynchronous event node to wait for a response from an asynchronous application view service, an event node can be created and set to wait for an event of a type such as "AI Async Response." Steps for setting an event node to use an XML variable to receive an asynchronous service response can include, first, opening a workflow template definition. A user can create an event node if one does not already exist, which will wait for an asynchronous response from a designated application view service. The user can select an already-defined string variable, and BPM will listen for an asynchronous response with an ID matching this variable.

The event node can wait for a response to an action, such as a call to an application view service, that was called asynchronously earlier in the workflow. The "call application view service" action can set the request ID variable. To make the action and this event node work together, they can both use the same request ID variable.

For asynchronous services that require storage of the response, a user can select a predefined XML variable, such as from a response document variable list. When BPM receives the response from the application view service, the response document variable can be used to store the response. If no suitable XML variable exists, the user can create a new variable. A preferred method for receiving an asynchronous service response may be to use a response document variable of type XML. However, if an existing workflow contains an asynchronous event node that was previously set to use an AsyncServiceResponse variable to wait for a response from an asynchronous application view service, a user can modify the event node.

If an event mode uses an AsyncServiceResponse variable to receive an asynchronous service response, one approach to modifying the event mode uses the following steps. A workflow template definition is opened and an asynchronous variable type selected. A user selects an already-defined string variable, and BPM listens for an asynchronous response with an ID matching this variable.

Callback Listener

A client can choose to invoke a service asynchronously if it is a long-running service. For instance, some SAP requests can take about two or three minutes to process. The processing of the request usually happens transparent to the client. If the user is sitting at a web page, it can be undesirable for the page to simply "hang" for two minutes without doing anything. It may be preferable to issue some sort of response, then update the web page once the proper response is received, such as a new message from SAP. This is one reason for using a callback listener for a synchronous responses. In this way, a client does not want to have to wait around for a response, but will instead be notified when the response is received by the callback listener.

A listen and receive event is another valuable part of certain embodiments in accordance with the present invention, as a listen and receive event is not addressed in the J2EE Connector architecture. A trigger can occur in an EIS, and external applications may need to know about the firing of the trigger. In other words, an event occurs that needs to be propagated out to certain applications. All the registered listeners may need to be notified as well.

As before, a client can create an application view and can add an event listener. A handler is created that knows what to do once it receives an event from the application view. The application view in one embodiment subscribes to a JMS topic and registers the listener on that topic. A JMS topic is a JMS feature to which JMS messages can be posted, similar to an inbox.

There can be defined an object, or application integration component, called an "event generator." One job of the event generator is to watch and communicate with an EIS to determine when an event occurs. For a DBMS adapter, this can involve a query on a staging table. A user can make a request, such as "select * from event." Any record in that event table will be a record of a new event in the DBMS. The event generator periodically look to the EIS for new events.

For example, when an order processing system is running low on an item in inventory, an event can result the system triggering a notification that it needs to restock a certain product. This event can happen, for example, in an EIS. Triggers can be used for DBMS. Once an insert occurs on a certain table, a trigger can fire and place information about the new data into the event table, such as by using an "insert into event . . . " statement. Then, once a new event occurs, the event generator can pull that event.

Security

A user can grant or revoke a user's access privileges by specifying a user or group name in an appropriate form. Each application view can have at least two types of access, including read access and write access. Read access allows the user to execute services and subscribe to events. Write access allows the user to deploy/edit/undeploy the application view.

If necessary, methods can be invoked on an application view that allow the security level be set before services are invoked on an application view. Methods such as "setConnectionSpec( )" and "getConnectionSpec( )" can be used to set the credentials for an EIS. Using a "ConnectionSpec" object. To instantiate a ConnectionSpec object, a class such as "ConnectionRequestInfoMap" can be provided, such as in an ADK. A user can also implement that a class created by that user. If a user creates a unique class, the user may need to include certain interfaces, such as a ConnectionSpec interface (JCA class), a ConnectionRequestInfo interface (JCA class), a Map interface (SDK class), and a Serializable interface (SDK class).

After implementing a ConnectionSpec class and instantiating a ConnectionSpec object, a user can use ConnectionSpec in conjunction with the setConnectionSpec( ) and getConnectionSpec( ) methods. To set the ConnectionSpec, a user can pass a properly initialized ConnectionSpec object. To clear the ConnectionSpec, the user can pass a ConnectionSpec object with a null value.

Migrating Data

Special care may need to be taken when migrating data between application server domains and between different instances of an EIS, as application views defined against one EIS instance can contain identifiers and data specific to that EIS instance. This can also be true of a connection factory used by the application view. A user may not be able to manually change EIS-instance-specific data in an application view or connection factory. These changes can, however, be made from an application view console by navigating to the desired application view and editing the application view. The user can identify and update all EIS-specific data in the application view, as well as any events, services and associated connection factories.

Any EIS-instance-specific references can be replaced with references to the new EIS instance in the target environment. In particular, the user can edit the application view and connection factory definitions. Application view definitions may need changes in an "EventRouterURL" or similar parameter, such as may be accessed through an application view "deploy" screen. This parameter can be used to refer to the event router in the target environment. Changes may also need to be made to parameters in the service definitions. These can be adapter-specific data that refers to EIS-instance-specific data. An editing feature can be used to change any EIS instance-specific parameters for the service. Event definition parameters may also need to be changed, which contain adapter-specific data that refer to EIS-instance-specific data. Each adapter can place different properties into a service and event.

Along with event and service adapters, an ADK designtime framework can provide the tools needed to build a Web-based GUI that adapter users need to define, deploy, and test their application views. Although each adapter can have EIS-specific functionality, all adapters require a GUI for deploying application views. This framework can minimize the effort required to create and deploy these interfaces. This minimization can be accomplished at least in part by using two primary components. One of these components is a Web application component that allows a user to build an HTML-based GUI by using, for example, Java Server Pages (JSP). This component can be augmented by tools such as JSP templates, a tag library, and the JavaScript library. A second component is a deployment helper component or request handler that can provide a simple API for deploying, undeploying, and editing application views on an application server.

While an application view can represent a business-level interface to the specific functionality in an application, an adapter can represent a system-level interface to all the functionality in the application. An application view can be configured for a single business purpose and can contain services related to that business purpose. These services can require only business-relevant data to be specified in the request document and return only business-relevant data in the response document. An application view can combine this business-relevant data with stored metadata necessary for the adapter. The adapter can take both the business-relevant data and the stored metadata, and can execute a system-level function on the application.

An application view can represent both events and services that support a business purpose. This can allow a business user to interact with the application view for all communication with an application. This bi-directional communication can be supported by an event adapter and a service adapter. An application view can abstract this fact from the user and present the user with a unified business interface to the application.

An event can be an XML document that is published by an application view when an event of interest occurs within an EIS. Clients that want to be notified of events can register their interest with an application view. The application view acts as a broker between the target application and the client. When a client has subscribed to events published by an application view, the application view notifies the client whenever an event of interest occurs within the target application. When an event subscriber is notified that an event of interest has occurred, it is passed an XML document that describes the event. Application views that publish events can also provide clients with the XML schema for the publishable events. An application view represents a business-level interface to specific functionality in an application.

A service can be a business operation within an application that is exposed by the application view. The service can exist as a request/response mechanism. When an application receives a request to invoke a business service, the application view can invoke that functionality within its target application and return, or respond with, an XML document that describes the results.

To define a service, a user may need to determine and define the input requirements, output expectations, and the content of the interaction specification.

When an application view is deployed, it can have an associated J2EE Connector Architecture CCI connection factory deployment. For example, if a user deploys the abc.xyz application view, application integration can deploy a new ConnectionFactory and bind it to a JNDI location connectionFactoryInstance. For efficiency sake, the new connection factory deployment can use the <ra-link-ref> setting in the weblogic-ra.xml deployment descriptor.

The <ra-link-ref> element can allow for the logical association of multiple deployed connection factories with a single deployed adapter. The specification of the optional <ra-link-ref> element with a value identifying a separately deployed connection factory can result in this newly deployed connection factory sharing the adapter which had been deployed with the referenced connection factory. In addition, any values defined in the referred connection factory's deployment can be inherited by this newly deployed connection factory unless specified. The adapter logical name can be used as the value for the <ra-link-ref> element.

Design-Time Features

Design-time development can have its own features, which can be different from those associated with run-time adapter development. For example, a design-time GUI can be comprised of a set of ten Java Server Pages (JSPs), for example. JSPs are HTML pages that call Java servlets to invoke a transaction. To a user, a JSP looks like any other web page. JSPs that comprise a design-time GUI can include, for example:

display.jsp—a display page, also called the Adapter Home Page; this page can contain HTML necessary to create the look-and-feel of the application view login.jsp—a Adapter Design-Time Login page confconn.jsp—a Confirm Connection page; this page can provide a form for the user to specify connection parameters for the EIS appvwadmin.jsp—an Application View Administration page; this page can provide a summary of an undeployed application view addevent.jsp—an Add Event page; this page can allow a user to add a new event to the application view addservc.jsp—an Add Service page; this page can allow the user to add a new service to the application view edtevent.jsp—an Edit Event page is an optional page that can allow users to edit events edtservc.jsp—an Edit Service page is an optional page that can allow users to edit services depappvw.jsp—a Deploy Application View page; this page can allow the user to specify deployment properties appvwsum.jsp—a Summary page; this page can display information about an application view, including the deployed/undeployed state; connection criteria; deployment information such as pooling configuration, log level, and security; a list of events; and a list of services.

JSP Templates

A design-time framework can provide a set of JSP templates for rapidly assembling a web application to define, deploy, and test a new application view for an adapter. A template is an HTML page that is dynamically generated by a Java Servlet based on parameters provided in the HTTP request. Templates can be used to minimize the number of custom pages and custom HTML needed for a web application. Templates can provide most of the HTML forms needed to deploy an application view. In many cases, the only custom forms can include a form to collect the EIS-specific connection parameters, a second form to collect the EIS-specific information needed to add an event, and a third form to collect the EIS-specific information needed to add a service. In addition, a custom JSP can be supplied for browsing a metadata catalog for an EIS.

Templates can also leverage the internationalization and localization features of the Java platform. The content of every page in the web application is stored in a message bundle. Consequently, the web interface for an adapter can be quickly internationalized. The templates can also centralize look-and-feel into a single location.

Using a Naming Convention

A naming convention can be used for the design-time Web application and connector deployment. When deploying an .ear file into an integration system, the file can be identified a configuration file, such as config.xml, by using the adapter logical name as the file name. This can be done, for example, by the following:

```
<Application Deployed="true" Name="ALN"
    Path="WLI_HOME/adapters/ADAPTER/lib/ALN.ear">
    <ConnectorComponent Name="ALN" Targets="myserver"
        URI="ALN.rar"/>
    <WebAppComponent Name="ALN_EventRouter"
        Targets="my server"
        URI="ALN_EventRouter.war"/>
    <WebAppComponent Name="ALN_Web"
        Targets="myserver" URI="ALN_Web.war"/>
</Application>
```

Alternatively, a text file named webcontext.txt can be included in the root of the .ear file. A file such as webcontext.txt can be used to contain the context for the design-time Web application for the adapter. This file can be encoded in UTF-8 format.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer implemented system for integrating applications, comprising:
   a resource adapter adapted to invoke functionality in a first application and expose that functionality wherein the functionality in the first application includes a set of executable statements invoked on the first application;
   an application view component adapted to allow a second application to access the first application through the resource adapter by defining a set of business functions corresponding to the functionality in the first application as exposed by the resource adapter wherein the set of business functions is specified by a business analyst to achieve a specific business objective; and
   wherein the application view component is adapted to be specific to the resource adapter and provides an abstracted interface to the first application via the resource adapter.

2. A system according to claim 1, wherein:
   the application view component is further adapted to provide a way for a second application to access the first application without the second application knowing functional details about the first application.

3. A system according to claim 1, wherein:
   the application view component is a business-focused interface.

4. A system according to claim 1, wherein:
   the application view component provides a self-describing interface to services and events in the first application.

5. A system according to claim 1, wherein:
   the application view component is adapted to expose functionality in the first application as a business service.

6. A system according to claim 1, wherein: the business analyst is any person in an enterprise having knowledge of the first application's business requirements.

7. A system according to claim 1, wherein: the application view component is adapted to send and receive messages in XML.

8. A system according to claim 1, wherein:
   the resource adapter is adapted to invoke functionality in a first application comprising an enterprise system.

9. A system according to claim 1, wherein:
   the application view component is adapted to allow bi-directional communication between the first application and the second application.

10. A system according to claim 1, wherein:
    the application view component translates messages between the first application and the second application.

11. A system according to claim 1, wherein:
    the application view component further comprises a Java interface for the second application, wherein the second application comprises a Java application that can use the application view component.

12. A system according to claim 1, wherein
    the application view component is a stateless session bean.

13. A system according to claim 1, further comprising:
    a business process management component adapted to allow an application view component to be invoked as a business service.

14. A system according to claim 1, further comprising:
    a web services interface adapted to be used with the application view component to allow a web service to be invoked through the application view component.

15. A system according to claim 1, further comprising:
    an integration framework adapted to host the application view component.

16. A system according to claim 15, wherein:
    the integration framework includes a graphical user interface that can be used for creating application view components.

17. A system according to claim 15, wherein:
    the application view component provides an abstraction layer between the resource adapter and the usage of functionality exposed by the adapter.

18. A system according to claim 1, wherein:
    the application view component is adapted to allow the definition of integration points corresponding to data for an application.

19. A system according to claim 18, wherein:
    the application view component is further adapted to allow the integration points to be organized by business semantics.

20. A system according to claim 1, wherein:
    the application view component is an XML-based interface; and
    wherein the first application is an enterprise system; and
    wherein the second application is an application server.

21. A system according to claim 1, further comprising:
    a second application view component adapted to provide a way for a third application to access the first application through the resource adapter.

22. A system according to claim 1, wherein:
the application view component is further adapted to expose each service for the first application as a logical business function.

23. A system according to claim 1, wherein:
the application view component is further adapted to provide metadata to describe a procedure for interacting with an enterprise system.

24. A system according to claim 23, wherein:
the application view component provides metadata in the form of an XML schema.

25. A system according to claim 1, wherein:
the application view is adapted to expose features selected from the group consisting of: outbound messages, inbound requests that return a message, and views of descriptions for message that can be sent outbound or processed inbound.

26. A system according to claim 1, further comprising:
an application view console adapted to provide a user interface for accessing the application view component.

27. A system according to claim 1, further comprising:
a container for the application view component, the container having allocated resources for the application view component that can service requests.

28. A system according to claim 1, wherein: the resource adapter is selected from the group consisting of service adapters and event adapters.

29. A computer implemented system of integrating applications, comprising:
a resource adapter adapted to invoke functionality in a first application and expose that functionality wherein the functionality in the first application includes a set of executable statements invoked on the first application;
an application view component adapted to allow a second application to access the first application through the resource adapter by translating the functionality in the first application as exposed by the resource adapter into extensible markup language (XML) statements and allowing the second application to communicate with the first application via XML statements; and
wherein the application view component is adapted to be specific to the resource adapter and provides an abstracted interface to the first application on top of the resource adapter.

30. A computer implemented system for integrating applications, comprising:
means for invoking functionality in a first application wherein the functionality in the first application includes a set of executable statements invoked on the first application; and
means for exposing that functionality to a second application by allowing the second application to access the first application wherein a set of business functions is defined corresponding to the functionality in the first application wherein the set of business functions is specified by a business analyst to achieve a specific business objective; and
wherein the means for exposing the functionality as a business service are adapted to be specific to the means for invoking functionality in the first application.

31. A computer implemented method of integrating applications, comprising:
providing a resource adapter adapted to invoke functionality in a first application and expose that functionality wherein the functionality in the first application includes a set of executable statements invoked on the first application;
providing an application view component adapted to allow a second application to access the first application through the resource adapter by defining a set of business functions corresponding to the functionality in the first application as exposed by the resource adapter wherein the set of business functions is specified by a business analyst to achieve a specific business objective; and
wherein the application view component is adapted to be specific to the resource adapter and provides an abstracted interface to the first application on top of the resource adapter.

32. A computer implemented method for updating records in a database, comprising:
using an application view component to receive an XML message to invoke an update method for updating the records in the database;
translating the XML message into standard query language statements (SQL) for executing updates of the database records;
calling a resource adapter from the application view component and passing the SQL statements to the resource adapter;
accessing enterprise data in an enterprise system using the resource adapter and returning the result to the application view component; and
returning the result from the application view component as a response XML message.

33. A computer implemented method for integrating applications, comprising:
providing a resource adapter to expose functionality in an application wherein the functionality in the application includes a set of executable statements invoked on the application; and
providing an interface for the resource adapter to invoke the exposed functionality wherein the interface is configured to define a set of business functions corresponding to the functionality in the application wherein the set of business functions is specified by a business analyst to achieve a specific business objective; and
wherein the interface is configured to be specific to the resource adapter.

34. A computer-readable medium having instructions stored thereon which when executed by one or more processors cause the system to:
provide a resource adapter adapted to invoke functionality in a first application and expose that functionality wherein the functionality in the first arplication includes a set of executable statements invoked on the first application;
provide an application view component adapted to allow a second application to access the first application through the resource adapter by defining a set of business functions corresponding to the functionality in the first application as exposed by the resource adapter wherein the set of business functions is specified by a business analyst to achieve a specific business objective; and
wherein the application view component is adapted to be specific to the resource adapter and provides an abstracted interface to the first application on top of the resource adapter.

35. A computer-readable medium having instructions stored thereon which when executed by one or more processors cause the system to:

use an application view component to receive an XML message to invoke an update method for updating the records in the database;
translate the XML message into standard query language statements (SQL) for executing updates of the database records;
call a resource adapter from the application view component and pass the SQL statements to the resource adapter;

access enterprise data in an enterprise system using the resource adapter and return the result to the application view component; and
return the result from the application view component as a response XML message.

* * * * *